US006217841B1

(12) United States Patent
Grindatto et al.

(10) Patent No.: US 6,217,841 B1
(45) Date of Patent: Apr. 17, 2001

(54) PROCESS FOR THE PREPARATION OF METAL CARBIDES HAVING A LARGE SPECIFIC SURFACE FROM ACTIVATED CARBON FOAMS

(75) Inventors: Bernard Grindatto, Pont en Royans; Alex Jourdan, Voiron; Marie Prin, Moirans, all of (FR)

(73) Assignee: Pechiney Recherche, Courbevoie (FR)

( * ) Notice: Subject to any disclaimer, the term of this patent is extended or adjusted under 35 U.S.C. 154(b) by 0 days.

(21) Appl. No.: 08/278,107

(22) Filed: Jul. 20, 1994

Related U.S. Application Data

(63) Continuation of application No. 07/979,044, filed on Nov. 19, 1992, now abandoned.

(30) Foreign Application Priority Data

Nov. 21, 1991 (FR) .................................................. 91 14607

(51) Int. Cl.[7] .................................................. C01B 31/30
(52) U.S. Cl. .................... 423/345; 423/249; 423/250; 423/251; 423/252; 423/256; 423/439; 423/440; 423/263
(58) Field of Search .................. 423/445 R, 460, 423/345, 440, 263, 249, 250, 251, 252, 256, 439; 502/177, 178

(56) References Cited

U.S. PATENT DOCUMENTS

| 3,345,440 | * | 10/1967 | Googin et al. ................ 264/29.1 |
| 3,859,421 | * | 1/1975 | Hucke ................................ 423/445 |
| 4,265,843 | | 5/1981 | Dias et al. .......................... 423/345 |
| 4,371,630 | * | 2/1983 | Koenig et al. .................. 156/274.4 |
| 4,439,349 | * | 3/1984 | Everett et al. ..................... 423/445 |
| 4,481,179 | | 11/1984 | Wei ...................................... 423/346 |
| 4,536,358 | | 8/1985 | Welsh et al. ......................... 264/81 |
| 4,775,655 | * | 10/1988 | Edwards ........................ 423/445 R |
| 4,914,070 | | 4/1990 | Ledoux et al. ..................... 423/346 |
| 4,915,924 | * | 4/1990 | Nadkarni et al. ................. 423/345 |
| 4,957,811 | | 9/1990 | Beaker et al. ..................... 423/345 |

FOREIGN PATENT DOCUMENTS

| 2909104 | * | 9/1979 | (DE) .................................... 423/345 |
| 2645143 | | 10/1990 | (FR) . |
| 60-191013 | * | 9/1985 | (JP) .................................... 423/345 |
| 60-195069 | | 10/1985 | (JP) . |

OTHER PUBLICATIONS

*Carbon Foam*, Phillips tech. Rev–36 (1976) 93–103 Knippenberg et al. (no month).*

* cited by examiner

*Primary Examiner*—Stuart Hendrickson
(74) *Attorney, Agent, or Firm*—Dennison, Scheiner, Schultz & Wakeman

(57) ABSTRACT

The invention relates to a silicon carbide or metal carbide foam to be used as a catalyst or catalyst support for the chemical or petrochemical industry or for silencers, as well as the process for producing the same.

The foam is in the form of a three-dimensional network of interconnected cages, whose edge length is between 50 and 500 micrometres, whose density is between 0.03 and 0.1 $g/cm^3$ and whose BET surface is between 20 and 100 $m^2/g$. The carbide foam contains no more than 0.1% by weight residual metal and the size of the carbide crystallites is between 40 and 400 Angstroms.

The production process consists of starting with a carbon foam, increasing its specific surface by an activation treatment using carbon dioxide and then contacting the thus activated foam with a volatile compound of the metal, whose carbide it is wished to obtain.

10 Claims, No Drawings

PROCESS FOR THE PREPARATION OF METAL CARBIDES HAVING A LARGE SPECIFIC SURFACE FROM ACTIVATED CARBON FOAMS

This is a continuation of abandoned application(s) Ser. No. 07/979,044 filed on Nov. 19, 1992.

TECHNICAL FIELD OF THE INVENTION

The invention relates to the technical field of heavy metal or silicon carbides having a large specific surface and intended to serve as catalysts or catalyst supports for the chemical or petrochemical industry or for silencers.

DESCRIPITON OF THE RELATED ART

The specific surface of a catalyst is due to three porosity types, namely a macroporosity due to the pores having an average diameter greater than 2 $\mu$m, a mesoporosity due to pores having an average diameter of 30 to 50 Angstroms and a microporosity due to pores having an average diameter of 5 to 15 Angstroms. A catalyst must have an adequate macroporosity in order to give the gases to be treated access to the micropores and particularly mesopores responsible for the actual catalytic activity.

French patent application 2,645,143 describes a process for the preparation of heavy metal carbides having a large specific surface and consisting of the vacuum reaction of a heavy metal compound, at a temperature such that said compound is gaseous, on a carbon having a large specific surface, e.g. active carbon. The carbide obtained retains the memory of the specific surface of the starting carbon and has a specific surface significantly larger than that of the prior art metal carbides, although smaller than that of the starting carbon.

In this carbide preparation process, the catalysts or supports obtained are in the form of a powder, or agglomerates in granule form for the formation of a fixed bed placed in a reactor. The gases to be treated flow, sometimes at high speed, through the said bed and consequently attrition phenomena occur with the production of fines, which clog the bed or seal the sintered parts defining said bed.

For certain catalytic applications, particularly for the catalysis of the oxidation of exhaust gases, it is necessary to choose the geometry of the support or catalyst and produce it in the form of monolithic parts, whilst ensuring the accessibility of the catalyst to the gases to be treated by the macroporosity thereof.

The problem of the invention is to obtain carbides having a high specific surface, in monolithic form and having a significant open macroporosity giving easy access to the reaction gases.

Thus, whereas in the process of French patent application 2,645,143, firstly the carbide was produced and then placed in a bed, in the process according to the invention firstly a porous solid carbon is produced and this is then transformed into metal carbide.

OBJECT OF THE INVENTION

The object of the invention is a process for the preparation of metal carbides having a large specific surface in monolithic form and a significant open macroporosity permitting easy access to the reaction gases, characterized in that the starting product is a carbon foam, which is activated to increase its specific surface and the activated carbon, under vacuum or inert gas scavenging, is subject to the action of a volatile compound of the metal in question. The use of certain organic precursors permitting by calcination the obtaining of carbon foams with interesting characteristics also forms part of the invention.

A second object of the invention is a monolithic catalyst support or a catalyst constituted by a silicon carbide or metal carbide foam having a significant open macroporosity, a large specific surface more particularly due to its mesoporosity and a small crystallite size, whilst having no residual metal or other metallic compound.

DESCRIPTION OF THE PRIOR ART

The aforementioned French patent application 2,645,143 describes the preparation principle of metal carbides having a large specific surface, as well as performance examples. The carbon having a large specific surface, e.g. active carbon, is mixed with a compound, which is volatile at the reaction temperature, of the metal whereof a carbide is to be obtained. The resulting product is placed in a crucible, which is heated to a temperature between 900 and 1400° C. under a vacuum below 13 hPa for between 1 and 7 hours, but usually at least 4 hours.

As a variant, it is also possible to vaporize the volatile compound of the metal in a first area and carry out the reduction and carburization in a second area, the temperatures of the two areas possibly being different.

French patent application 2,621,904 describes the preparation of silicon carbide SiC with a specific surface exceeding 100 m$^2$/g by generation in a first area of SiO vapour by the reaction of SiO$_2$ on Si at a temperature between 1100 and 1400° C. and under a vacuum of 0.1 to 1.5 hPa and reaction, in a second area, of the SiO formed with carbon having a specific surface exceeding 200 m$^2$/g and at a temperature between 1100 and 1400° C.

U.S. Pat. No. 2,431,326 (Heyroth) describes a product constituted by a continuous, crosslinked, crystalline SiC skeleton distributed in a uniform manner and whose interstices are filled with silicon or a silicon-rich compound. The skeleton can be produced by calcining wood, molasses, casein, dextrin, flour or other carbonizable substances. Preferably, use is made of the reaction of HCL or H$_2$SO$_4$ on furfural, furfuryl alcohol or mixtures thereof. The carbon precipitates very rapidly and grows in dendritic form in order to form a sponge filling the entire receptacle. The thus obtained skeleton is contacted with silicon, e.g. by making it float on molten Si well above the melting point thereof or by exposing it to silicon vapours.

French Patent 1,484,116 (US Atomic Energy Commission) describes a process for the preparation of foams of carbon and carbides (particularly Si) by a method derived from the preparation of polyurethane foams. The reaction of an isocyanate on an alcohol or a phenol leads to a urethane and with diisocyanates and dialcohols straight-chain polyurethanes of formula:

(—OC—NH—R—NH—CO—O—R'—O—)

are obtained. In addition, the isocyanates react with water giving CO$_2$ and a urein.

Polymerization in the presence of water consequently makes it possible to form polyurethane foams which, by carbonization, give carbon foams. However, the carbon yield is low and the foams obtained are not solid.

Thus, the invention of said patent consists of on the one hand mixing a binder, whose C yield is high and partly polymerized furfuryl alcohol and on the other hand mixing powders of metals or metal oxides in order to obtain metal or metal carbide foams (W,Ta,Nb,Al,B,Si).

In the process described, the carbide is obtained in a single operation, at the time of calcining the mixture of the resins and the metal oxide or metal, which does not make it possible to control the specific surface of the carbide obtained. In the process of the present patent application, the carbide is obtained in two operations separated by the activation of the foam, which makes it possible to obtain a much larger specific surface of the carbide (20 to 100 m²/g), a smaller crystallite size (40 to 400 Angstroms=40 to $400.10^{-10}$ m) and a carbide foam containing little or no residual metal (<0.1% by weight).

British Patent 2,137,974 (UK Atomic Energy Authority) describes the production of a silicon matrix reinforced by a silicon carbide network by the treatment of a carbon foam by contacting molten silicon.

SUMMARY OF THE INVENTION

The process according to the invention consists of the combination of the following successive stages:

- optionally, preparing carbon foam by calcining a foam of an organic polymer,
- producing, from the thus prepared carbon foam or a commercially available carbon foam, a part having the dimensions and shape of the catalyst support or catalyst which it is wished to obtain,
- preferably, degassing the carbon foam part in vacuo or under the scavenging of an inert gas, such as argon,
- activating the surface of said part by exposing it to an oxidation in carbon dioxide $CO_2$,
- exposing the thus activated part to the action of a volatile compound of the metal, whose carbide is to be prepared at a temperature (1000 to 1400° C.) and for a time (2 to 6 hours) such that the metal content of the compound is reduced and the metal is carburized. This stage is performed either in vacuo, or under inert gas scavenging at atmospheric pressure.

DETAILED DESCRIPTION OF THE INVENION

Starting Products: Carbon Foams

The carbon foams are obtained in the form of a three-dimensional network as interconnected cages, whose edges have thicknesses of a few micrometres, whereby the length of said edges can vary between 50 and 500 micrometres. Their BET surface is very small and is usually below 1 m²/g. Their density can vary significantly, namely from 0.03 to 0.1 g/cm³, as a function of the relative dimensions of the thicknesses and the lengths of the edges. As a function of the catalytic reaction nature and the mechanical or thermal characteristics expected of the catalyst or its support, foams with a higher or lower density will be chosen. They are obtained by calcining foams of organic resins, e.g. polyurethanes.

They can be obtained commercially. However, the Applicant has found that it was advantageous to prepare them from certain organic precursors, polymer foams, with a view to obtaining a porous texture favourable to their use as catalysts or catalyst supports.

Two precursors have been found to be particularly suitable for the envisaged use, namely polyacrylonitrile or PAN and polyurethane foams.

The PAN used is in the form of rigid panels having a density between 0.03 and 0.3 g/cm³ and of the type marketed e.g. by Saitec. Its porous structure is essentially closed, but the Applicant has found that it was possible to produce by pyrolysis a carbon foam extremely rich in open micropores and mesopores. In order to develop an adequate macroporosity to permit the access of the gases to said mesopores and micropores, it is merely necessary to make fine, closely positioned holes in the part having the geometry of the desired catalyst and cut from the panel. This is followed by the pyrolysis of the part at a temperature of 700 to 900° C., for 1 to 2 hours and under a neutral atmosphere of e.g. nitrogen or argon. The total specific surface of the carbon foam obtained then exceeds 300 m²/g, whilst that due to the mesopores is 10 to 100 m²/g. Under these conditions, there is no need to activate the foam.

Polyurethane foams have numerous applications in everyday life, namely packaging, furniture, etc. It is therefore very easy to obtain them at low price, e.g. by recycling spent foams.

The production of carbon foams therefrom involves the following stages:

- cutting up a part having the shape of the desired catalyst support,
- washing the foam with a hot soda solution for a few minutes,
- rinsing with running water and drying,
- impregnating the foam with a resin, e.g. furfuryl resin, and draining the impregnated foam so that there remains 0.03 to 0.1 g of resin/cm³ of foam,
- pyrolysis of the impregnated foam up to 1200° C.

This operating procedure makes it possible to produce carbon foams having a good resistance to crumbling and a homogeneous structure.

Activation of the Foams

The commercially obtained or specially produced carbon foams do not have an adequate mesoporosity and microporosity to be used as catalysts, with the exception of those prepared from PAN. It is therefore appropriate to activate them. In order to activate the foam, it is heated at a temperature between 700 and 1000° C., under scavenging with carbon dioxide $CO_2$ and at atmospheric pressure, for a period of 1 to 24 hours.

As a result of a controlled oxidation of the foam, this operation leads to the development of a mesoporosity and microporosity constituted by pores having a diameter between 20 and 200 Angstroms. Thus, its specific surface passes from less than 1 m²/g to several tens and even hundred m²/g.

It can take place discontinuously using fixed charges, or preferably in a passage furnace in which the foam parts are placed either on a conveyor belt, or in containers which travel through the furnace.

Preparation of the Metal Carbide

Finally, the last stage consists of exposing the activated foam part to the action of a volatile compound of the metal, whose carbide is to be prepared at a temperature and for a time such that the metal content of the compound is reduced and the metal is carburized. This stage is performed either in vacuo, or under inert gas scavenging at atmospheric pressure.

The metals from which it is wished to produce the carbide by the process according to the invention are in particular transition metals (groups 3b,4b,5b,6b,7b,8 of series 4,5,6 of the classification of elements), metals of rare earths and actinides, but also silicon.

They must also have at least one volatile compound under the reaction temperature conditions. Among these compounds, preferably oxides or iodides are chosen, but it is also possible to use other compounds such as chlorides, fluorides or sublimatable organometallic compounds. Among the metals having these characteristics and whose carbides have a catalytic interest, reference is made to Mo, W, Re, V, Nb, Ta, Ti, Cr, Ni.

Several methods are available for exposing the activated foam to the action of the volatile metal compound. As for the preceding activation operation, it is firstly possible to operate discontinuously by immersing or simply placing the activated foam part in or on a powder bed of the volatile compound. The product is then placed in an enclosure raised to the desired temperature between 1000 and 1400° C. The application of the vacuum or scavenging by an inert gas aids the elimination of carbon monoxide CO, which forms when the chosen volatile compound is an oxide. As this stage can be performed under inert gas scavenging at atmospheric pressure, as in the activation operation, it is also possible to operate continuously in a passage furnace. The activated foam parts are still immersed or simply placed in or on a powder bed of the volatile compound. The product is placed in successive containers, which traverse the furnace heated to the desired temperature and scavenged by an inert gas.

The metal compound can be in the form of a more or less fine powder, or in agglomerated, granular or pellet form.

In the particular case of silicon, it is advantageous to use as the volatile compound the silicon suboxide SiO. This volatile compound is obtained by reducing silica $SiO_2$, either by carbon, or by silicon, in accordance with one or other of the following reactions:

$SiO_2+C=SiO+CO$ $SiO_2+Si=2SiO$

However, said suboxide SiO is unstable at low temperatures, where it undergoes a disproportionation into Si and $SiO_2$ in a reversal of the preceding reaction. In addition, when it is wished to prepare silicon carbide according to the invention, it is necessary to produce the SiO in the actual carburization furnace. This takes place in a very simple way. The procedure is as in the general case described hereinbefore, but the volatile compound bed is replaced by a silica bed mixed with silicon. The transformation reaction into SiC is fast and complete.

The Applicant has found that in the case of carburization under inert gas scavenging, the CO content on leaving the reactor would constitute a way to control its operation in order to ensure an optimum, constant efficiency and a good quality of the products.

The reduction and carburization reactions produce CO, which is entrained by the inert gas, which favours the evolution of the reaction towards the formation of carbide. The Inventors have discovered the important part played by the partial CO pressure in the inert gas. If this pressure becomes too high, there are two harmful effects. As a function of the temperature, it can locally give rise to a retrogression of the carburization, the CO reacting on the carbide formed in order to give once again the oxide and carbon, which reduces the efficiency of the reactor. It can give rise to the oxidation of the volatile oxide in order to form a less volatile oxide, generating carbon fines. This is more particularly the case with silicon monoxide SiO, which reacts on the CO in order to once again give silica and carbon. This carbon deposition on the SiO source (mixture of Si and $SiO_2$) pollutes said mixture and gives rise to carbide, which clearly does not have the characteristics and in particular specific surface of that obtained by "filiation" from solid carbon introduced as the starting material. Therefore the CO content on leaving the reactor is a way to control its operation so as to ensure an optimum, constant efficiency and a good quality of the products, more particularly a low, unreacted oxide quantity.

This has led the Inventors to the introduction into their operating procedure of two supplementary means, namely the prior degassing of the carbon foam and the control of the reaction by the partial Co pressure.

1) Prior Degassing of the Carbon Foam

The Applicant has found that all the carbon monoxide present in the scavenging gas does not solely come from the reduction and carburization reactions, but also from the actual carbon foam. This foam, produced at a temperature below those of the reactions used in the present process, contains on the surface organic chemical species, which consequently have hydrogen and oxygen atoms. These organic products, when heated to the carburization temperature, decompose and lead to the giving off of CO and $OH_2$, which is prejudicial to the carburization reactions.

Therefore one of the means of the present invention consists of carrying out a prior degassing of the carbon foam before contacting it with the oxide of the metal, whose carbide it is wished to obtain.

This degassing takes place under an initial vacuum or under scavenging by an inert gas such as argon, at a temperature and for a time such that the carbon foam when then placed at a temperature and in an inert gas flow identical to those of the carburization reaction, the partial CO pressure does not exceed 2 hPa in the case of silicon carburization. This partial pressure substantially corresponds to the pressure beyond which the reaction $SiO+CO=SiO_2+C$ occurs in the sense of the formation of $SiO_2$. In practice, the recommended degassing takes place at temperatures between 1000 and 1200° C. for between 0.5 and 2 hours.

2) Control of the Reaction by the Partial CO Pressure

In order to permit this control, said process comprises a control loop incorporating the measurement either continuously or at regular intervals of the CO content of the inert gas on leaving the reactor, the comparison with a reference range and a modification of the operating parameters in order to restore the CO content to within said range. Action preferably takes place on the inert gas flow rate, which will be increased in the case of an increase in the CO content. Therefore, an inert gas addition is initiated if the CO content exceeds a certain fixed threshold, e.g. 2 hPa. Conversely, when the CO pressure drops below another threshold, e.g. 0.05 hPa, said additional inert gas flow is eliminated.

It is also possible to vary the reaction temperature, which is decreased or increased as a function of whether the CO content increases or decreases, but this is more difficult to apply, because the temperature variations have more inertia than the flow rate variations.

The process, including the control of the reactor by the CO content, is then characterized by the following stages:

introducing into a reactor a reactive mixture constituted on the one hand by carbon foam, whose specific surface is at least equal to 200 $m^2/g$ and which has previously been degassed, and on the other hand a compound, which is volatile under the conditions of the reaction, of the metal, whose carbide is to be produced and in proportions close to stoichiometry;

scavenging the reactor by an inert gas flow introduced from the side of the entrance of the reactive mixture and extracted from the side of the exit of the carbide obtained;

heating the reactive mixture to a temperature between 900 and 1400° C. for a time adequate to volatilize the metal compound, reduce it by the carbon and finally carburize the reduced product;

cooling the carbide obtained, still in the presence of the inert gas, to a temperature such that it no longer oxidizes on contact with air;

extracting the carbide from the reactor;

and in that measurement takes place continuously or at regular intervals of the CO content of the inert gas on leaving the reactor, said value is compared with a reference range and the operating parameters are modified to restore the CO content to within the range by acting on the inert gas flow rate, which is increased if the CO content increases and which is decreased if the CO content decreases, or alternatively action takes place on the reaction temperature.

Product Obtained

The product according to the invention, i.e. the catalyst or catalyst support obtained has characteristics revealing its filiation from the activated carbon foam. Thus, its macroporosity is constituted by a three-dimensional network of interconnected cages, whose edges have thicknesses of a few micrometres and lengths between 50 and 500 micrometres.

The mesoporosity developed by the carbon foam activation treatment persists, but the average diameter of the mesopores has been increased by an approximate factor of 3. The microporosity developed by the carbon foam activation treatment has almost completely disappeared. This leads to a smaller BET surface than that of the activated foam, but larger than that of the starting carbon foam, being between 20 and 100 $m^2/g$.

The density of the carbide foam is of the same order of magnitude as that of the carbon foam, i.e. 0.03 to 0.1 $g/cm^3$, as a function of the relative thicknesses and lengths of the edges. The carbide obtained is constituted by elementary crystals or crystallites of small size between 40 and 400 Angstroms. It contains little or no residual metal, namely less than 0.1% by weight.

EXAMPLES

Example 1

Production of Carbide Foam from Polyacrylonitrile

From a rigid PAN panel was cut a part shaped like a cylinder with a diameter of 25 mm and a length of 75 mm. In order to develop an adequate macroporosity to give access for the gases to the mesopores and micropores which are to be developed by calcination, radial holes were made having a diameter of 1 m and a centre-to-centre distance of 3 mm over the entire cylinder surface. This was followed by the pyrolysis of the part at a temperature of 800° C., for 2 hours and under a nitrogen atmosphere. The specific surface of the carbon foam obtained due to the micropores was then 320 $m^2/g$ and that due to the mesopores 40 $m^2/g$. Under these conditions there is no need to activate the foam.

The carbon foam is then placed in a reactor on a bed constituted by an intimate mixture of silica and silicon powder. The reactor is placed under argon scavenging at a flow rate of 50 litres/hour and then heated to 1400° C., which is maintained for 5 hours. Then, still under argon scavenging, the reactor is cooled to ambient temperature.

The product obtained is a silicon carbide foam in the form of a porous texture, whose macroporosity is constituted by holes made in the precursor, whose microporosity has virtually disappeared and whose mesoporosity has a specific surface of 35 $m^2/g$. The silicon carbide crystallites have small dimensions between 40 and 400 Angstroms. The product contains little or no residual metal, namely less than 0.1% by weight.

The permeability of this carbide was compared with that of a conventional, cordierite catalyst support having the same shape and size. It is in fact a very important use characteristic of silencer catalysts, which must not cause an excessive pressure drop in the high flow rate outflow of exhaust gases. The pressure drop per length unit P/l is given by the formula:

$$P/l = \mu*d/k_1*S + m*d^2/k_2*S^2$$

in which P is the pressure drop, l the sample length, S the sample section, $\mu$ the fluid viscosity, m the fluid density, d the fluid flow rate and $k_1$ and $k_2$ are two characteristic coefficients of the permeability of the sample.

It should be noted, all things being equal, that the pressure drop P decreases, i.e. the permeability increases as $k_1$ and $k_2$ increase.

The following table gives the values of the coefficients $k_1$ and $k_2$ for the conventional cordierite foam and for the SiC foam.

|  | $k_1$ ($m^2$) | $k_2$ (m) |
| --- | --- | --- |
| Cordierite foam | $9*10^{-9}$ | $1.4*10^{-4}$ |
| SiC foam | $2.2*10^{-8}$ | $1.3*10^{-3}$ |

The table makes it clear that the coefficient $k_1$ is 2.4 times higher and the coefficient $k_2$ 9.3 times higher for SiC than for cordierite and consequently silicon carbide is much more permeable than cordierite.

Example 2

Production of Carbon Foam from Polyurethane

From a polyurethane foam panel was cut a part having approximately the shape and dimensions of a silencer catalyst. This part was washed in an aqueous 4% soda solution at 65° C. and for 8 minutes, followed by abundant rinsing with running water, followed by drying in an oven at 150° C. for 30 minutes or in a microwave oven for 15 minutes. The dried part was then impregnated with a furfuryl resin to which had been added 2% hexamethylene tetramine, followed by draining so as to leave 0.065g of resin/$cm^3$ of foam. The impregnated foam was then pyrolyzed up to 1200° C. under the following temperature rise conditions:

a) 10° C./min. up to 250° C., b) 1/min. up to 800° C., c) 3° C./min. up to 1200° C., d) maintaining at 1200° C. for 2 hours.

The thus obtained carbon foam has an adequate macroporosity for the access of gases, but its mesoporosity and microporosity are inadequate. It therefore requires activation under the conditions of Example 3 before performing carburization under the conditions of Example 1.

Example 3

Activation of the Foam

A commercially available carbon foam with a very low density of 0.03 $g/cm^3$ and with a very small BET surface of less than 1 $m^2/g$ was used as the starting product. The foam was placed in a reactor raised to a temperature of 900° C., in which there is a circulation of oxygen-free carbon dioxide at a rate of 200 litres/hour, measured under normal temperature and pressure conditions. The activation reaction lasts 2 hours, after which the foam is cooled to ambient temperature under inert gas circulation. The activated foam obtained has a considerably increased BET specific surface of 680 m²/g.

Example 4

Production of Silicon Carbide (SiC) Foam

An activated foam sample obtained in accordance with the conditions of Example 3 is placed in a reactor on a bed constituted by an intimate mixture of silica and silicon powder. The reactor is then placed under argon scavenging at a flow rate of 50 litres/hour and then heated to 1400° C. This temperature is then maintained for 5 hours after which, under argon scavenging, the reactor is cooled to ambient temperature.

The reaction is controlled by the partial CO pressure in the scavenging gas on leaving the reactor. When said partial pressure exceeds 2 hPa, the argon flow rate is increased. When said pressure drops below 0.05 hPa, said flow rate is restored to its initial value.

The silicon carbide foam is then treated with air at a temperature between 600 and 800° C. in order to eliminate residual activated foam which has not reacted. This gives a silicon carbide foam with the following characteristics:

composition of the foam 100% beta SiC; 0% residual carbon; 0% silicon;

crystallite diameters: 52 Angstroms;

BET surface: before oxidation treatment 19 m²/g, after oxidation treatment 22 m²/g.

Example 5

Production of Molybdenum Carbide ($Mo_2C$) Foam

A sample of the foam obtained according to the conditions of Example 1 is placed in a reactor on a bed constituted by molybdenum trioxide $MoO_3$. The reactor is placed under argon scavenging at a rate of 50 litres/hour and then heated to 1300° C. This temperature is maintained for 5 hours, after which, still under argon scavenging, the reactor is cooled to ambient temperature.

A molybdenum carbide ($Mo_2C$) foam is obtained having the following characteristics:

composition of the foam: 83% $Mo_2C$; 17% residual carbon; 0% metallic molybdenum;

crystallite diameter: 270 Angstroms;

BET surface: 150 m²/g.

Example 6

Comparison with Silicon Carbide Prepared from Active Carbon

The silicon carbide foam obtained in accordance with the conditions of Example 4 was compared with SiC granules with dimensions between 1.25 and 2.5 mm prepared from active carbon on the one hand according to the conditions of French patent application 2,621,904, i.e. under a mercury vacuum of $10^{-2}$ mm (1.333 Pa) and on the other hand according to similar conditions in which the vacuum has been replaced by argon scavenging.

The synthesis conditions and characteristics obtained are given in the following table:

| | | | | | Crystallite size | BET Before | After |
|---|---|---|---|---|---|---|---|
| T | | Medium | Time | Phases | | | |
| SiC foam | 1400° C. | Argon | 5 h | SiC 100% | 52 | 19 | 22 |
| SiC granules | 1330° C. | vacuum | 8 h | SiC 67% C 33% | 101 | 127 | 27 |
| SiC granules | 1400° C. | Argon | 5 h | SiC 87% C 13% | 240 | 38 | 20 |

In this table the crystallite sizes (6th column) are given in Angstroms =$10^{-10}$ m, whilst the 7th and 8th columns give the BET surface in m²/g respectively before and after the oxidation treatment with a view to eliminating the residual carbon. The composition of the phases (4th column) is clearly given before said treatment.

The conclusions drawn from this table are:

the BET surfaces, which are an important characteristic for the use of these products as catalysts or catalyst supports, are of the same order of magnitude for the three products;

the use of carbon foam makes it possible to obtain a much finer crystallite size than the processes based on active carbon, no matter whether this is in vacuo or under an inert gas;

the substitution of argon scavenging for the vacuum makes it possible to significantly reduce the treatment times from 8 to 5 hours.

What is claimed is:

1. Carbide foam of an element selected from the group consisting of Si, Mo, W, Re, V, Nb, Ta, Ti, Cr, Ni, rare earth elements and actinide elements, for use as a catalyst or catalyst support having open pores including macropores of a pore diameter between 50 and 500 µm and mesopores of a pore diameter between 30 and 50 Angstroms in the form of a three-dimensional network of interconnected cages, a density between 0.03 and 0.1 g/cm³, a BET specific surface area between 20 and 100 M²/g, no more than 0.1% by weight residual said element and carbide crystallites of a size between 40 and 400 Angstroms.

2. Carbide foam according to claim 1 prepared from activated carbon foam, wherein there are substantially no pores having an average diameter of 5–15 Angstroms.

3. Process for the preparation a carbide foam monolith of an element selected from the group consisting of Si, Mo, W, Re, V, Nb, Ta, Ti, Cr, Ni, rare earth elements said carbide foam and actinide elements, having a BET specific surface area of between 20 and 100 m²/g, for use as a catalyst or catalyst support, consisting essentially of the steps of:

producing a carbon foam part having a density between 0.03 and 0.1 g/cm³, a BET specific surface area less than 1 m²/g, and the dimensions and shape of the monolith;

activating the surface of said carbon foam part by oxidation in a carbon dioxide containing atmosphere at a temperature between 800 and 1000° C. for between 1 and 4 hours, to substantially increase the BET specific surface area, to produce an activated part;

degassing the activated part under vacuum or by scavenging with an inert gas, at between 1000 and 1200° C. for between 0.5 and 2 hours;

exposing the degassed part to the action of a volatile compound of said element at a temperature between 1000 and 1400° C. for between 2 and 6 hours, so that said element in the compound is reduced and the element is carburized, to produce said monolith.

4. Process for the preparation of a carbide foam monolith of an element selected from the group consisting of Si, Mo, W, Re, V, Nb, Ta, Ti, Cr, Ni, rare earth elements and actinide elements, said carbide foam having a BET specific surface area of between 20 and 100 $m^2/g$, for use as a catalyst or catalyst support, comprising the steps of:

producing, from a polyacrylonitrile panel, an initial part having the dimensions and shape of the monolith;

making a plurality of holes in said initial part in order to create an open porosity having an average pore diameter of more than about 2 $\mu$m;

pyrolyzing the initial part with holes in a inert atomosphere at a temperature of 700 to 900° C., for 1 to 2 hours to produce a carbon foam part having a total surface area greater than 300 $m^2/g$ and a specific surface area due to pores of average diameter of 30–50 Angstroms of 10 to 100 $m^2/g$;

exposing the pyrolyzed part to the action of a volatilized compound of said element at a temperature between 1000 and 1400° C. and for a time between 2 and 6 hours, so that the element of the compound is reduced and the element is carburized to produce the monolith.

5. Process according to claim 4, wherein the monolith has open pores including macropores of a pore diameter between 50 and 500 $\mu$m, and mesopores of a pore diameter between 30 and 50 Angstroms.

6. Process according to claim 3 wherein the carbon foam is produced from a polyurethane foam by a process comprising the steps of:

washing the polyurethane foam with a sodium hydroxide solution;

rinsing the washed foam with water and drying;

impregnating the dried foam with a resin and draining the impregnated foam so that 0.03 to 0.1 g of resin/$cm^3$ foam remains in the foam; and pyrolyzing the impregnated foam at a temperature of up to 1200° C.

7. Process according to claim 3, wherein the exposing step takes place by immersing the activated part in or by placing the activated part on a bed of the volatile compound.

8. Process for the preparation of silicon carbide monolith having a BET specific surface area of between 20 and 100 $m^2/g$, for use as a catalyst or catalyst support, consisting essentially of the steps of:

producing a carbon foam part having the dimensions and shape of the monolith;

activating the surface of said carbon foam part by oxidation in an atmosphere containing carbon dioxide at a temperature between 800 and 1000° C. for between 1 and 4 hours, to increase the BET specific surface area of the carbon foam part;

degassing the activated part under vacuum or by scavenging with an inert gas, at between 1000 and 1200° C. for between 0.5 and 2 hours;

exposing the deaassed part to the action of silicon suboxide SiO at a temperature between 1000 and 1400° C. and for a time between 2 and 6 hours, so as to completely transform the suboxide into silicon carbide, and produce the monolith.

9. Process according to claim 8, wherein the exposing step comprises immersing the activated part in or placing the activated part on a bed formed from a mixture of silica and silicon and reacting said mixture to form SiO.

10. Process according to claim 3, 4, or 8, wherein the exposing step takes place under inert gas scavenging to remove CO at a flow rate sufficient to maintain CO produced by the carburizing at a partial pressure below 2 hPa.

\* \* \* \* \*